RANDOM ACCESS ADDRESS SELECTION APPARATUS

Filed Sept. 24, 1963 2 Sheets-Sheet 1

INVENTOR.
MARSHALL M. BROWN
BY Fulwider, Patton, Rieber, Lee, and Utecht
ATTORNEYS

RANDOM ACCESS ADDRESS SELECTION APPARATUS

Filed Sept. 24, 1963 2 Sheets-Sheet 2

INVENTOR.
MARSHALL M. BROWN
BY Zulwider, Patton, Rieber, Lee, and Utecht
ATTORNEYS United States Patent Office 3,345,624
Patented Oct. 3, 1967

3,345,624

RANDOM ACCESS ADDRESS SELECTION APPARATUS

Marshall M. Brown, San Marino, Calif., assignor to United Data Control, Inc., South El Monte, Calif., a corporation of Washington Filed Sept. 24, 1963, Ser. No. 310,996
13 Claims. (Cl. 340—174.1)

ABSTRACT OF THE DISCLOSURE

Address selection apparatus for selecting individual items such as tape magazines which are randomly stored in a plurality of positions on a shelf or the like. A plurality of address lines are common to each item storage position and logic means are located at each position to detect inquiry over a selected group of address lines representing the specific address of the item stored at that position.

This invention relates generally to the addressing and rapid, automatic selection of individual items from within a larger group of items occupying a plurality of random storage positions in a system. More particularly, this invention relates to a new and improved method and means for selecting a uniquely identified object or group of objects randomly oriented within a larger family or group of objects, the method and means being independent of the random location of the desired object or group of objects relative to the remainder of the family and obviating the need for conducting any serial or other systematic sequential search for the desired object or group of objects within the family.

In the electrical and mechanical arts, it is common practice to select desired individual items from within a larger family of items by searching through all of the items and serially testing every item until all of the desired items have been located. This approach has usually been used wherever random storage techniques are employed, as in the case of punched cards, numbered boxes, magnetically recorded tapes and the like. Efforts to reduce the searching time necessitated by such serial testing techniques have generally required that some form of systematic storage be adapted, or have required complex decoding procedures involving additional time and circuitry to set up the coding each time changes are made. This additional complexity and expense of circuit patching has generally rendered the latter approach undesirable. Moreover, systematic storage techniques using mechanical means for the selection of desired items from within a larger family have generally proven unsatisfactory because of excessive bulkiness of apparatus, lack of speed, and lack of flexibility due to the inability of the system to be readily expanded to include larger groups of items in excess of the original design capacity of the system.

Hence, those concerned with the development of automatic address selection systems have long recognized the need for improved methods and means capable of simply, economically, and rapidly selecting uniquely identified items from their random storage positions within a larger group. In addition, the quest has been for a flexible system lending itself readily to expansion beyond its original design capacity. The present invention fulfills all of these needs.

Accordingly, it is an object of the present invention to provide a new and improved method and means of address selection which overcomes the above and other disadvantages of the prior art.

Another object is to provide a new and improved method and means of uniquely identifying all of the objects of a group.

A further object of the invention is the provision of a new and improved method and means for rapidly selecting such uniquely identified items.

Still another object is to provide a new and improved method and means of address selection wherein the addresses of all of the items in a group are simultaneously searched in response to an address inquiry.

Yet another object of the present invention is the provision of a new and improved method and means of automatic address selection which obviates the need for sequential examination of each object or group of objects in a family being searched, whereby a considerable savings of time is effected.

A still further object is to provide a new and improved method and means of address selection wherein selected items are instantly located at their random storage positions within a family of items without requiring any preliminary grouping or systematic organization of the items.

Still another object is the provision of a new and improved selection system wherein addressed items may be readily added or removed from the family without disturbing remaining items in the family and without requiring any mechanical and/or electrical modifications to the system.

A still further object is to provide a new and improved address selection system which may be readily expanded, with a minimum of mechanical and/or electrical modifications, to include additional addressed items beyond the original design capacity of the system.

Yet another object of this invention is to provide a new and improved method and means for address selection wherein the speed of item selection is essentially instantaneous and independent of the number of items in the family.

Still another object is to provide a new and improved method and means of automatic address selection wherein the selection process is not interrupted by insertion or removal of any items of the family.

Another object is to provide a new and improved method and means of automatic address selection which is compatible with a variety of identifying codes such as decimal, binary, binary coded decimal and the like.

A further object of the present invention is the provision of new and improved means for uniquely identifying items or groups of items within a family and wherein the unique identification of any item may be readily altered in a simple and convenient manner.

The above and other objects and advantages of this invention will be better understood by reference to the following detailed description, when considered in connection with the accompanying drawings of illustrative embodiments thereof, and wherein.

Figure 1:
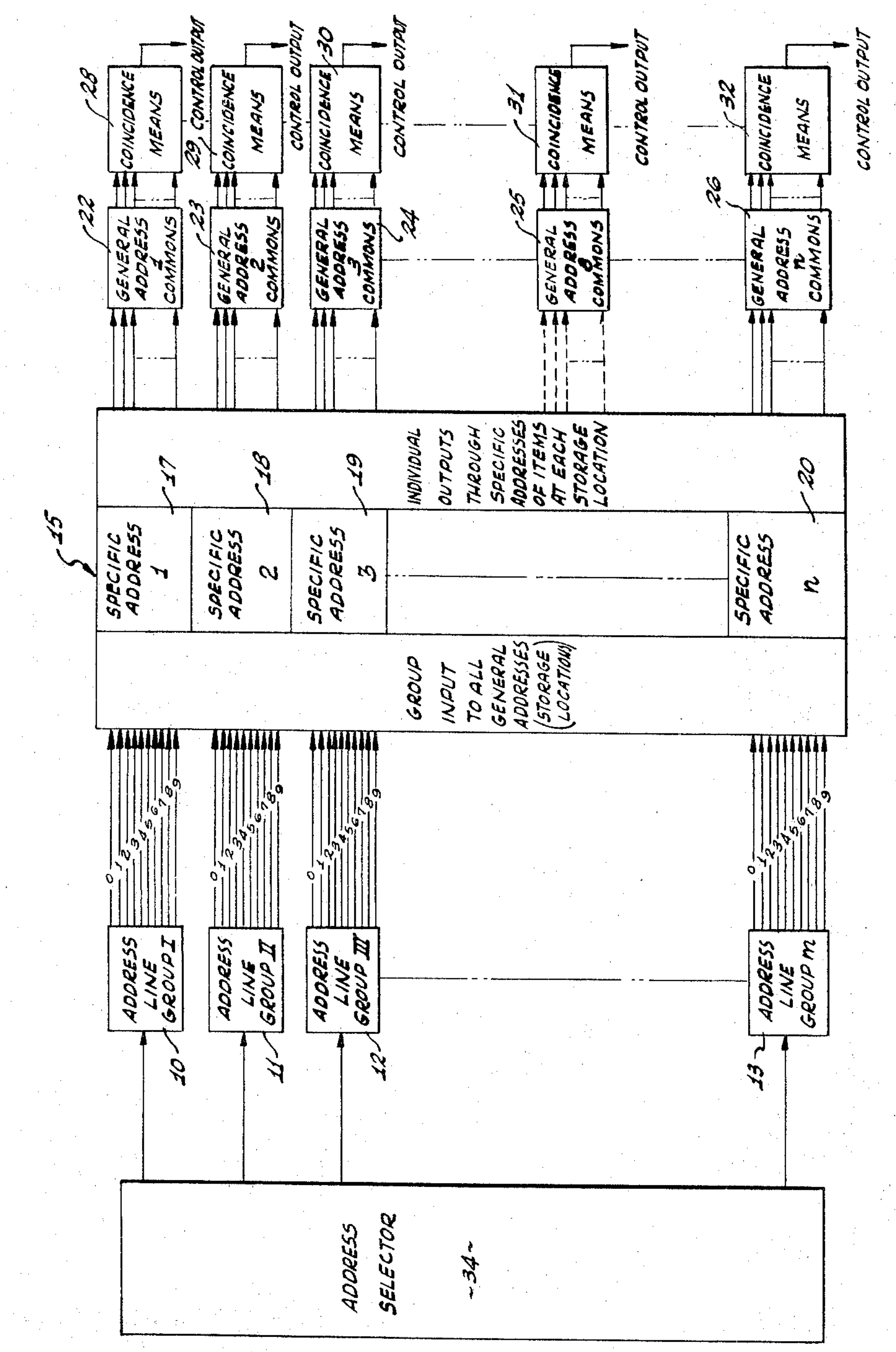
FIGURE 1 is a block diagram illustrating the basic concepts of the present invention.

Referring now to the drawings, and particularly to FIGURE 1 thereof, there is shown a generalized system for selecting any ony or more uniquely addressed items from among a family of any number of $n$ items. In a presently preferred embodiment of the invention, address selection is accomplished by energizing various combinations of electrical busses, the latter being accomplished via switches, transistors, or other suitable electrical circuitry from a power source appropriate to the selection logic circuitry employed. However, although the invention is particularly well adapted to electrical implementation, it is to be understood that the invention is not so limited, and hydraulic, pneumatic, or other equivalent means may also be used in practicing the invention.

The system of FIGURE 1 includes a plurality of address lines arranged in groups 10–13, the latter groups being representative of any number of groups I, II, III, . . . *m* depending upon the number of items which the system may ultimately be expanded to include within the selection family. In this connection, and solely by way of example, each group of address lines is shown to include ten lines representing the digits 0–9 inclusive in a decimal system. Hence, address line group I represents the digits 0–9 in the "Units" address column for radix ten, address line group II represents 0–9 in the "Tens" address column, address line group III represents 0–9 in the "Hundreds" address column, etc.

Means denoted generally by reference numeral 15 are embodied by the system of FIGURE 1 to provide a definite number of storage locations for all of the items, e.g. 17–20, of the family from which selection is to be made. The number of such storage locations provided may initially be minimal for small family groups. However, the number of storage locations may, in accordance with the invention, be subsequently expanded to include a greater number of locations with absolutely no modification in the method of selection or overall operation of the system.

Each of the storage locations, prior to being occupied by an item of the family from which selection is made, has the same general address as every other unoccupied storage location, in that every storage location receives every address line from every group I–*m*. However, although every unoccupied storage location has the same general address, this general address is incapable of completing any selection circuit or control loop until installation of an item at that location to impart to the then occupied location the unique address of the item installed at that location. The latter also provides simultaneously the means for completing a selection loop at that storage location from specific address lines in accordance with the specific address of the installed item.

Since the general address for any given storage location is converted into the specific address for a particular item only upon actual installation of that item at that storage location, the items of the selection family may be intermingled and dispersed among the various storage locations with absolutely no effect upon the operation of the system. Regardless of the storage location ultimately chosen for any particular item, the general address for that location will always assume the specific address uniquely identifying the item occupying that location as soon as the item is installed at that location. Moreover, if the latter item is subsequently removed from the first storage location and installed at a second storage location, the first storage location will return to its general address state until another item is installed at that location, whereas the second storage location will assume the specific address previously attributed to the first storage location. In this manner, the identity of each item is passed on to its storage location, regardless of which storage location is being used, rather than the storage location imparting some specific identification to the particular item occupying that location. Thus, each of the items in the family from which selection is to be made is uniquely identified, and each item carries its identification with it regardless of its particular location in the system.

By way of example, items 17–20 are schematically depicted in their storage locations in any random order and are representative members of a family of items having specific addresses 1, 2, 3, . . . *n*, respectively. Each storage location embodies a "common" contact or routing element for each address line group. Hence, if there are seven address line groups (for one million different addresses in a radix ten decimal system), there are seven "commons" or routing elements at each storage location. However, in the absence of an installed item at a storage location, there is no mechanical or electrical coupling between any of the "commons" at that storage location and any of the address lines. Only when an item is actually installed at a storage location are the "commons" for that storage location connected to specific address lines, in accordance with the specific address of the installed item. Usually, this entails connecting a single selected address line from each address line group to a separate one of the "commons" at that storage location. Thus, the address of each item not only uniquely identifies that item, but also provides the means for coupling selected address lines to the "commons" of the storage location at which the item is installed.

Each of the blocks 22–26 in FIGURE 1 designates a set of "commons" for a particular general address or storage location within the system. Every storage location is provided with such a set of "commons," and the number of "commons" in each set is the same. However, as previously indicated, no set of "commons" is connected to any of the address lines until an item is actually installed at the particular storage location having that set of "commons." In this connection, note the solid line inputs to blocks 22–24 and 26, representing the "commons" at storage locations 1, 2, 3 and *n*, respectively, whereas the inputs to block 25 representing the "commons" for storage location 8 are dotted. This indicates that storage locations 1, 2, 3 and *n* are occupied by addressed items, the installation of which completes the selection loops between the "commons" for these locations and specific address lines, in accordance with the respective addresses of the items installed at these locations. In contrast, storage location 8 is vacant and, therefore, there is no coupling between the "commons" of storage location 8 and any of the address lines. However, if an item is subsequently installed at storage location 8, the "commons" for that storage location will automatically be coupled to selected address lines within the address line groups, in accordance with the specific address uniquely identifying the item installed at storage location 8.

Blocks 28–32 indicate coincidence means for each and every storage location 1, 2, 3 . . . 8, . . . *n*, respectively. Each coincidence means, which may be an AND gate or the like, receives a plurality of inputs equal to the number of "commons" at that storage location, each input being from a different one of the "commons" at that location, and each coincidence means is adapted to produce a control output only upon simultaneous activation or energization of all of its inputs. Hence, the coincidence means for any particular storage location will produce a control output only if it receives a simultaneous input from every "common" at that location. On the other hand, the latter can occur only if all of the address lines satisfying the specific address of the uniquely identified item installed at that particular storage location are also activated or energized simultaneously. The control outputs of the various coincidence means may be used for any desired purpose, e.g., ejection of an item, closing of an electrical circuit, etc.

The operation of the overall system of FIGURE 1 is next described. An address selector, 34, selects individual address lines within each of the address line groups in accordance with the specific address of a desired item within the selection family. The address selector is essentially a bank of switches which may be manually operated or under the control of an appropriate programmer (not shown). For example, if it is desired to select an item having a specific address 306542, then the address selector 34 would activate or energize the appropriate digits in each address line group corresponding to the latter address, i.e., the 2-line in address line group I, the 4-line in group II, the 5-line in group III, the 6-line in group IV, the 0-line in group V, and the 3-line in group VI would all be connected to an appropriate power source (an E.M.F. in an electrical system, or hydraulic or pneumatic source in a mechanical system).

Having energized all of the appropriate address lines representing the specific address 306542, and since every address line goes to every storage location, the item or items bearing that specific address will automatically be detected regardless of location or locations occupied in the system. The storage of items can be completely random, but since address inquiry is simultaneously made of every storage location, it does not matter whether the item sought, i.e., the item uniquely identified by the address set up by the address selector 34, is in storage location 1, storage location 50, storage location 500,000 or any other storage location. Inquiry is made of every storage location on a simultaneous, parallel basis, and selection of items having the requisite specific addresses set up by the address selector 34 is made the instant the information is entered. In this connection, it should be noted that a single address may be used to uniquely identify a group of items rather than a single item, in which case all of the items of that group are simultaneously selected when that specific address is entered by the selector 34. Moreover, the address selector 34 may be programmed to energize more than one address line in each address line group, so that more than one address can be searched simultaneously.

Let us assume that specific address 3 is the desired 306542. Since specific address 3 is the address of the item at storage location 3, all of the storage location 3 "commons" are connected to address lines which have been appropriately activated or energized. Hence all of the inputs to coincidence means 30 are likewise energized or activated and a control output is derived therefrom. Therefore, the control output is obtained only at the storage location occupied by an item bearing the specific address satisfied by the energized combination of address lines. If the item bearing the address 306542 is subsequently moved to storage location 8, then a control output would be derived from coincidence means 31 for storage location 8, rather than coincidence means 30 for storage location 3.

Again by way of example, let it be assumed that specific address 2 of the item at storage location 2 is 306543. Hence, all but one of the "commons" at storage location 2 are connected to an activated or energized address line. The latter, however, fails to enable the coincidence means 29 for location 2, since all of the inputs to the coincidence means are not energized and, therefore, no control output from coincidence means 29 can be obtained.

It will be apparent from the foregoing description of the system of FIGURE 1 that the speed of address selection is extremely rapid, since all storage locations are simultaneously searched, and correct selection is immediately made regardless of the number of items in the family. Selection may be made from among a family of one million addressed items just as simply and rapidly as from among a family of only three or four items. Changes in the storage arrangement may be readily accomplished by simple insertion and/or withdrawal of any items in the family, without regard to location within the family and without disturbing any other items. Moreover, the system is extremely flexible in that it can easily be expanded to include any number of addressed items within the selection family.

Figures 2, 2A, 3:
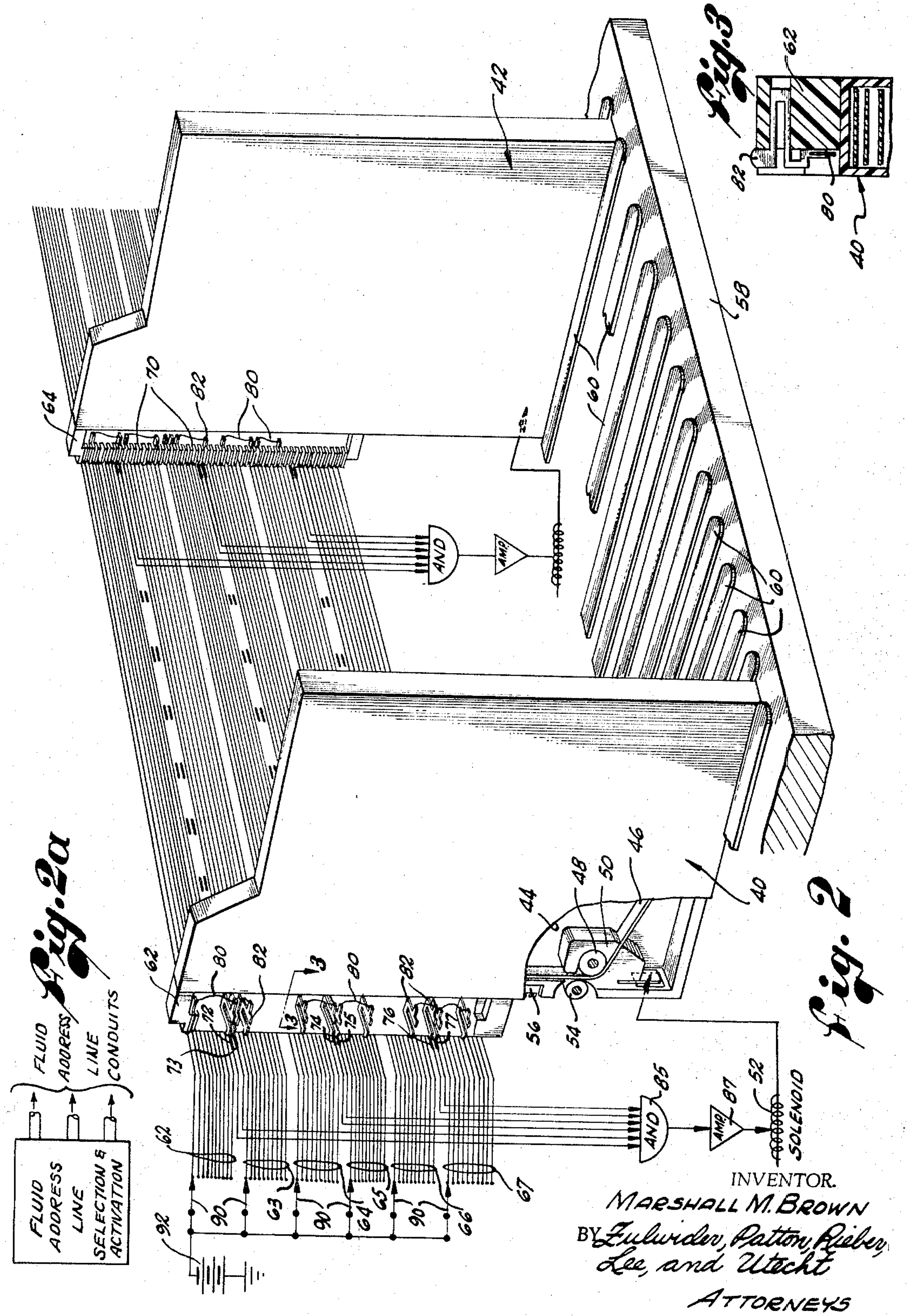
FIGURE 2 is a combined schematic and fragmentary perspective view of a tape magazine selection and energization system in accordance with the invention.
FIGURE 2*a* is a combined schematic and fragmentary view of an alternative embodiment of a system in accordance with the invention.
FIGURE 3 is an enlarged, fragmentary sectional view, taken along the line 3—3 in FIGURE 2, and illustrates the structure of an electrical address connector used to provide a unique address for each of the tape magazines of FIGURE 2.

Referring now more particularly to FIGURE 2, there is shown an embodiment of the invention wherein the automatic address system locates and triggers operation of a selected magnetic tape recording magazine randomly stored within a family of possibly hundreds of similar magazines. In this connection, two such tape magazines 40, 42 are shown in FIGURE 2 as illustrative member items of the family from which selection is to be made. Except for their identifying addresses, items 40, 42 are structurally identical and, therefore, all comments regarding the magazine 40 are deemed equally applicable to the magazine 42.

The tape magazine 40 may be of the type disclosed in copending application Ser. No. 284,920, filed June 3, 1963, for "Tape Drive Mechanism," now U.S. Pat. No. 3,174,671, and assigned to the same assignee as the present application. The magazine 40 includes an outer casing 44 for shielding a tape storage compartment wherein a portion of a tape loop 46 passes around a pressure roller 48 carried by a rocker arm 50. The pivotal position of the rocker arm 50, and hence of the pressure roller 48, is under the control of a solenoid 52 to selectively bring the tape 46 into engagement with a tape-driving capstan 54. All electrical connections to the magazine 40 are made through an appropriate male contact plug 56 at the side of the magazine.

All of the magazines are stored side by side upon a shelf 58 in an equipment rack. To this end, the shelf 58 is provided with a plurality of elongated, raised shoulders 60 integral with the upper face of the shelf and dividing the shelf into a plurality of storage locations, each storage location being defined by the space between a pair of adjacent shoulders 60. Each of the magazines 40, 42 has an address connector 62, 64, respectively, secured to the end of the magazine which normally abuts the rear of the shelf 58 when the magazine is installed at a storage location. No electrical connections whatever need be made between the address connectors 62, 64 and their respective tape magazines 40, 42. Each address connector provides the means for uniquely identifying its respective tape magazine, and this identification is carried with that magazine regardless of its particular storage location within the system. The largest "address" designated for any tape magazine is limited solely by the ultimate capacity chosen for the system, i.e., the number of address lines and particular code employed.

Each shelf 58 in the equipment rack has space for an alloted number of tape magazines, and a new magazine may be placed in any unoccupied storage location. At the rear of the shelf 58 is an insulating panel (not shown) upon which are mounted a plurality of exposed, horizontally extending, electrically conductive busses divided into address line groups 62–67. By way of example, as in the system of FIGURE 1, the address line groups 62–67 each contain ten lines representing the digits 0–9 for decimal coding of addresses.

Referring now to FIGURES 2 and 3, each address connector 62, 64 is provided with a plurality of slots 70 along its length, the slots being grouped to correspond to the grouping of the address line busses at the rear of the magazine shelf 58. Each group of slots 70 contains eleven slots for the ten address lines of that particular group plus the "common" for that group. In this connection, it will be observed in FIGURE 2 that the rear of the shelf 58 is also provided with a plurality of electrically "common" contacts, one "common" for each group of address lines, at every storage location. Note the six common contacts 72–77 for the six groups of address lines at the storage location occupied by the tape magazine 40. Every "common" at every storage location is electrically insulated from every other "common" at that storage location and every other storage location.

Each of the address connectors 62, 64 provides the means for positioning a number of electrical jumpers 80 so that their associated contacts 82 will mate with the various address line busses and "common" contacts at the rear of the shelf 58. Each jumper 80 consists of a short length of insulated wire connecting a pair of the electrical contacts 82, each of the latter contacts being removable from the slots 70 to alter its location and, hence, the address of that particular connector and tape magazine. For each address line group at each storage location, there is a contact 82 in a position corresponding to one of the address line busses in that group. The latter contact 82 is connected to another contact 82 via one of the jumpers 80. The contact 82 which does not mate with the position of an address line buss mates with the position of the "common" contact for that address line group and thus extends the electrical circuit from the address line through the jumper 80 to the "common" contact associated with that address line group for that particular storage location.

Each of the contacts 82 is preferably of a resilient material, such as brass or the like, so that it can be removably received in any of the slots 70 interchangeably. Hence, the address connector can be readily set up for any given specific address of its tape magazine, and this address can subsequently be altered at will merely by re-arranging the positions of the contacts 82 in the slots 70 of the address connector. All that is necessary to set up a specific address is to insert a contact 82 in each of the slots 70 of the address connector which correspond to the positions of the address line busses representing the required digits in each address line group for the designated address. Each of the contacts 82 thus installed is then connected through its jumper 80 to another contact 82 which has been installed in a slot 70 corresponding to the position of the "common" contact for that address line group.

With the address line connector, e.g., 62, thus set up, and with the magazine 40 fully inserted into the shelf 58 at a storage location, the contacts 82 complete electrical circuits through their respective jumpers 80 to the inputs of an appropriate logic circuit associated with each and every storage location. The logic circuits shown in FIGURE 2 each include an AND gate 85, the inputs of which are electrically connected to the "common" contacts for that particular storage location. If all of the inputs to the AND gate 85 are simultaneously energized, the AND gate produces an output signal which is amplified by a power amplifier 87 to energize the solenoid 52. The solenoid 52, in turn, actuates the tape drive mechanism in the magazine 40. On the other hand, if any one or more of the inputs to the AND gate 85 are not energized, as would be the case where the address connector 62 is not set up for the specific address for which a search is being made, then the AND gate produces no output, the solenoid 52 is not energized, and thus the tape magazine is not operated.

The selection of the particular address to be searched by the system of FIGURE 2 is accomplished by setting a plurality of decade switches 90 so that the appropriate address line buss of each address line group is energized from a battery 92 or the like. The address being searched may be changed by simply altering the settings of the decade switches 90 to energize different combinations of address line busses.

As in the case of the system of FIGURE 1, the selection time for the system of FIGURE 2 is completely independent of the number of items in the family from which selection is to be made, and selection occurs immediately upon entering of the desired address by the decade switches 90. It will also be apparent that the system of FIGURE 2 may be readily extended to include additional magazines merely by adding additional shelves and electrically connecting the busses of the added shelves in parallel with the busses of the shelf 58, whereby all of the magazines on all of the shelves can be searched simultaneously for the specific address set up by the decade switches 90 of the address selector. FIGURE 2*a* illustrates the extension of the system of FIGURE 2 to an arrangement utilizing hydraulic, pneumatic or other means equivalent to the electrical system.

The present invention satisfies a long-existing need in the art for a simple, economical, and flexible system capable of instantly selecting specific items randomly stored within a group of any size. Moreover, it will be apparent from the foregoing that, while particular forms of my invention have been illustrated and described, various modifications can be made without departing from the spirit and scope of my invention. Accordingly, I do not intend that my invention be limited, except as by the appended claims.

I claim:

1. A system, comprising:
a plurality of item storage locations;
a plurality of address lines common to each of said storage locations;
means for selectively inquiring over specified combinations of said address lines in accordance with specific addresses being sought;
logic means at each of said storage locations, each of said logic means having a plurality of inputs and being adapted to produce an output only upon simultaneous activation of all of its inputs;
at least one item randomly stored among said item storage locations;
and address means embodied by each item for coupling specific ones of said address lines, in accordance with the specific address of its respective item, to the inputs of said logic means at that storage location.

2. A system as set forth in claim 1, wherein said plurality of address lines are all electrical conductors, and address inquiry is made through said lines by electrical energization of selected address lines.

3. A system as set forth in claim 1, wherein said plurality of address lines are fluid conduits and address inquiry is made through said lines by fluid activation of selected address lines.

4. An address selection system, comprising:
means defining a plurality of item storage positions;
a plurality of address lines common to all of said storage positions;
means for selectively activating specified combinations of said address lines in accordance with specific addresses being sought;
logic means at each storage position, each of said logic means having the same number of inputs and being adapted to produce an output only upon simultaneous activation of all of its inputs;
a plurality of items randomly distributed among said item storage positions;
and address means for each of said items, each address means coupling specific ones of said address lines, in accordance with the specific address of its respective item, to the inputs of the logic means at that storage position, whereby all of the inputs of that logic means are connected to different address lines, said coupling between said address lines and the inputs to said logic means occuring automatically upon installation of the respective item in any storage position.

5. A system as set forth in claim 4, wherein said address means are variable for altering the specific addresses of any of said items.

6. In an automatic address selection system, the combination comprising:
means defining a plurality of item storage locations;
a plurality of address lines feeding all of said storage locations in common;
coincidence means at each of said storage locations, each coincidence means having a plurality of inputs and being adapted to produce an output only upon simultaneous energization of all its inputs;
and a plurality of specific address means occupying a plurality of said storage locations at random, each of said specific address means connecting specific ones of said address lines as inputs to the respective coincidence means at that storage location, whereby that storage location assumes the specific address of its specific address means as long as it is so occupied.

7. A system as set forth in claim 6, wherein said coincidence means is an AND gate.

8. An automatic address selection system, comprising:
a family of general addresses;
a plurality of address lines feeding all of said addresses in common;
AND gate means at each general address, each AND gate means having a plurality of inputs and being adapted to produce an output only upon simultaneous energization of all of its inputs;
specific address means occupying a plurality of general address locations in random order, each specific address means connecting specific ones of said address lines as inputs to the respective AND gate means at that general address location, whereby said general address assumes the specific address of the specified address means occupying that location, said specific address means being removable for installation at any other general address location at random, removal of said specific address means from an initial location restoring the initial location to the general address state, and installation of said specific means at a subsequent location automatically converting the general address of said subsequent location to the specific address of said specific address means;
and means for energizing selected ones of said address lines in accordance with the specific addresses sought.

9. A system as set forth in claim 8, wherein each of said specific address means is adjustable to change its specific address.

10. In a system for rapidly selecting desired members from random storage locations within a group, the combination comprising:
a plurality of members of a group;
a plurality of stations, each station being adapted to receive at least one of said members;
a plurality of address lines common to all of said stations;
a plurality of contacts at each station, said contacts being isolated from said address lines, the number of such contacts being the same at each station;
and means embodied by each of said members for automatically coupling, upon installation of a member at any station, the contacts of that station to selected address lines at that station, the coupling pattern being uniquely identified in accordance with the unique address of that member.

11. A system, comprising:
a plurality of members of a group;
a plurality of stations, each station being adapted to removably receive one of said members;
a plurality of address lines common to all of said stations;
coincidence means at each station, each coincidence means having a plurality of inputs and being adapted to produce an output only upon simultaneous energization of all of its inputs;
a plurality of contacts at each station, said contacts being isolated from said address lines at said station, the number of said contacts at each of said stations being the same;
address means embodied by each member for uniquely identifying each member relative to said group and for automatically connecting selected ones of said address lines to the contacts at any station occupied by its respective member;
and means for coupling the contacts at each station to the inputs of the coincidence means for that same station.

12. An automatic address selection system, comprising:
means defining a plurality of item storage locations;
a plurality of electrically conductive address lines feeding each of said storage locations in common;
a source of electrical energy;
switching means for selectively connecting said source of electrical energy to specific combinations of said address lines in accordance with specific addresses being sought;
AND gate means at each of said storage locations, each AND gate means having a plurality of inputs and being adapted to produce a control output only upon simultaneous energization of all of its inputs;
a plurality of items randomly stored among said item storage locations;
and an address connector carried by each item for identifying that item and for automatically coupling specific ones of said address lines, in accordance with the specific address of its respective item, to the inputs of said AND gate means at that storage location upon installation of its respective item at that storage location.

13. A system, comprising:
shelf means defining a plurality of tape magazine storage locations;
a plurality of electrically conductive busses adjacent said shelf means and feeding each of said storage locations in common;
a source of DC electrical energy;
a plurality of switching means for selectively connecting said source of electrical energy to specified combinations of said electrically conductive busses in accordance with the specific addresses being sought;
AND gate means at each of said storage locations, each AND gate means having a plurality of inputs and being adapted to produce an output only upon simultaneous energization of all of its inputs;
a plurality of contacts at each storage location, said contacts being electrically insulated from said electrically conductive busses, the number of contacts at each storage location being the same;
means for coupling the contacts at each storage location to the inputs of the AND gate means at that same storage location;
a plurality of tape magazines occupying said storage locations at random;
an address connector affixed to each of said tape magazines for identifying each of said tape magazines, each address connector automatically electrically connecting specific ones of said electrically conductive busses, in accordance with the specific address of its respective tape magazine, to the contacts at any storage location upon installation of its respective tape magazine at that storage location, each address connector being variable to alter its address connections and hence the specific address of its tape magazine;
and means at each storage location responsive to the output of the AND gate means at that storage location for controlling the operation of the tape magazine installed at that storage location.

References Cited

FOREIGN PATENTS 913,798 12/1962 Great Britain.

BERNARD KONICK, *Primary Examiner.*

A. I. NEUSTADT, *Assistant Examiner.*